United States Patent

[11] 3,627,646

[72] Inventor Asriel Osdor
  Tel Aviv, Israel
[21] Appl. No. 847,103
[22] Filed Aug. 4, 1969
[45] Patented Dec. 14, 1971
[73] Assignee Hydro Chemical & Mineral Corp.
  New York, N.Y.

[54] MULTISTAGE COLUMNAR FLASH EVAPORATORS AND CONDENSERS WITH INTERSPERSED STAGING
28 Claims, 15 Drawing Figs.

[52] U.S. Cl. .................................. 202/173,
  202/185 A, 203/12, 159/2 MS, 159/18, 159/DIG. 17
[51] Int. Cl. .................................. B01d 3/00,
  B01d 3/02, B01d 1/28, B01d 1/26
[50] Field of Search ........................... 159/18, 2;
  203/100 DC, 11, 12; 202/173, 236, 185 A

[56] References Cited
UNITED STATES PATENTS

| | | | |
|---|---|---|---|
| 1,468,679 | 9/1923 | Skinner, Jr. ................ | 159/20 |
| 2,182,428 | 12/1939 | Fladmark .................... | 159/48 |
| 3,249,517 | 5/1966 | Lockman ..................... | 159/18 X |
| 3,298,932 | 1/1967 | Bauer ........................ | 203/11 |
| 3,303,106 | 2/1967 | Standiford, Jr. ............ | 159/18 X |
| 3,483,093 | 12/1969 | Walker et al. ............... | 203/11 |
| 411,012 | 9/1889 | Chapman ...................... | 159/17 |

OTHER REFERENCES
Perry-Chem. Engrs. Handbook, 4 th Ed., McGraw-Hill Book Co. Inc., N.Y., page 18- 14.

Primary Examiner—Norman Yudkoff
Assistant Examiner—J. Sofer
Attorney—Ward, McElhannon, Brooks & Fitzpatrick ABSTRACT: Multiple stage condensation of vapors at different pressures and temperatures by direct contact with a condensing liquid flowing down by gravity against increasing vapor pressure of successive condenser stages arranged in groups of successive stages each containing several elevationally displaced condenser stages where the condenser stages in at least two of such groups are interspersed so that the condenser stages of one of the groups are located elevationally between the condenser stages of the other group and pumping means arranged to pump the condensing liquid from group to group, and novel dual liquid flash evaporation arrangements wherein streams of a first liquid to be evaporated are sprayed at and collide with a free surface of another, hotter, liquid to achieve partial vaporization of the first liquid, and the first liquid thereafter forms droplets in and sinks down through the other liquid and coalesces under the other liquid to achieve further vaporization.

MULTISTAGE COLUMNAR FLASH EVAPORATORS AND CONDENSERS WITH INTERSPERSED STAGING

This invention relates to the condensation of vapors, and more particularly it concerns multiple stage condensation of vapors at different pressures and temperatures by direct contact with a flowing condensing medium.

While the principles of the present invention may find wide application in a number of different environments, the invention is particularly well suited for use in multistage flash distillation systems for recovering fresh water and/or salts from the sea. In a pair of copending applications, Ser. No. 742,865 filed July 5, 1968, and Ser. No 831,087 filed June 6, 1969, (hereinafter referred to as the "Osdor applications") there are described flash distillation systems of the type with which the present invention may be used. These systems make use of a series of pressure reductions to produce vapors from preheated saline water. The saline water is mixed with hot oil and is admitted in admixture with the oil to a lowermost evaporation chamber maintained at a pressure just below the saturation pressure of the heated saline water. A portion of the saline water vaporizes in the first chamber and the heat of vaporization is extracted from the oil and the unevaporated portion of the water thereby reducing its temperature. The aforementioned applications show novel arrangements for making effective use of the difference of pressure between stages and of the energy release in vapor formation to drive the oil and unevaporated saline water up into a second chamber at a higher elevation. The second chamber is maintained at a lower pressure so that further vaporization takes place in that chamber with a similar further temperature reduction and a driving of the unevaporated water and oil to a third evaporation chamber. This process repeats itself with the liquids being driven on to successive evaporation chambers whose elevations may be above, below or on the same level with the next preceding chamber depending on the desired operating conditions and on the temperatures of the adjacent stages.

In order to condense the vapors produced in each evaporation chamber the vapors are contacted with a cool condensing liquid such as oil. The oil, which initially is at a temperature lower than that of the lowest pressure evaporation chamber first contacts the vapors from the chamber and condenses them. The condensing oil absorbs the latent heat of vaporization from the vapors, condenses the latter and this raises the temperature of the oil It then passes along and contacts the vapors from the evaporation chamber at the next higher pressure and temperature to condense them, and so on, back down to the first evaporation chamber.

The condensing liquid, i.e., oil and previously condensed water, is subjected not only to higher and higher temperature but also to higher and higher pressures as it contacts the vapors produced in the successive evaporator chambers. In order to accommodate these increased pressures the condensing liquids must be provided with an adequate pressure head between each stage. Prior to the aforementioned Osdor applications it was generally necessary to provide a multiplicity of individual pumps, one between each adjacent pair of condenser stages to force the condensing liquid and the associated previously formed condensate from one stage to the next. The desalination systems described in the Osdor applications do not require separate pumps between successive stages. In those systems the self lift effect produced during evaporation permits an inversion evaporation chambers in respect of pressure so that the lower pressure evaporation chambers are at the higher elevations. Condensation is achieved by pumping the condensing liquid up to the highest level and letting it flow by gravity down through the successive condenser stages of increasing pressure. A liquid pressure head is maintained between adjacent condenser stages at different elevations and this pressure head is regulated automatically and drives the condensing liquid from stage to stage against increasing pressure.

Certain practical difficulties have been encountered in connection with the use of a gravity pressure head to bring condensing liquids up to proper pressure for successive condensation of vapors produced in multistage flash evaporators; and it is to these difficulties that the present invention is addressed. In a desalination system in which saline water is flashed for example from 180° C., to 45° C., in 34 stages, the vapors thus produced are condensed at pressures which range from 9.317 kilograms/centimeter for the highest condensing temperature to 0.090 kilograms/centimeter$^2$ for the lowest condensing temperature. These pressures correspond, respectively, to about 93 meters and 1 meter of water. Now where oil is used as the condensing medium, these heights must be increased by the reciprocal of the specific gravity of the oil. For example, where a condensing oil having a specific gravity of 0.8 is employed, the above pressure heads would be 115 and 1.2 meters respectively. In addition, the various condenser chambers themselves may each occupy as much as 2 meters of height which should be added to the pressure difference between the stage to obtain the total structural height of the system. It will be appreciated that if a direct gravity flow is employed the height required for the condenser system would present substantial structural difficulties.

The present invention overcomes these difficulties and makes it possible to condense, by direct contact gravity flow, vapors at widely divergent pressures without the necessity for an unwieldy condenser structure of exceptional height. The condensing arrangements of the present invention permit structures of minimal height an of extraordinary simplicity In fact, the condenser arrangements used in the practice of the present invention may be made from simple pipelike structures with suitable internal partitioning and proper interconnections.

According to one aspect of the present invention, the vertical distance required between adjacent condenser stages in one flow path to maintain a proper pressure differential between the stages, is used to accommodate the condenser stages of one or more other flow paths. This permits physical integration of the several condensing liquid gravity flow paths; and it avoids, to a great extent, the relatively large investment in the construction of the condenser system of a single long gravity flow path as well as in several shorter gravity flow paths having the same total length as the single long gravity flow path.

According to a further aspect of the present invention there is provided a novel multiple stage solvent and solute recovery system in which a solution, e.g., saline water is evaporated in a series of evaporator stages and the vapors produced are condensed in a corresponding series of condenser stages. This novel system comprises a number of elongated vertical pipes arranged adjacent each other and containing partitions separating them into stages. Certain of the pipes contain evaporator stages and a U-tube arrangement as described in the aforementioned Osdor applications interconnects the bottom of a higher pressure stage with the next lower pressure evaporator stage. The remaining pipes contain the direct contact condenser stages; and these are interconnected in a pattern which allows a gravity formed pressure head of liquid to exist between adjacent stages. The evaporator stages and the condenser stages, according to the present invention, are arranged in groups wherein the stages are interspersed in a manner that the stages of one group are placed within the elevational displacement of adjacent stages of another group of stages, and which includes pumps for returning the condensing liquid from the lowermost stage of each group to the uppermost stage of the next lower pressure group.

According to another aspect of the invention, there are provided novel arrangements for enhancing vaporization in a dual liquid flash-type evaporation system. This aspect of the invention is particularly suited to oil-water systems wherein oil and water are flowed together through a series of stages at successively lower pressures.

In the past, it has been apparent that in order to attain the full potential of an oil-water system, some means had to be found to improve the flow of heat from the hot oil which does not evaporate, into the saline water, which does evaporate and loses heat in so doing. Now heat transfer between fluids is generally improved by increasing the mixing action between the fluids, as for example by subjecting them to turbulent flow.

In the case of the present invention, however, improved heat flow between the two liquids is achieved not merely by continuous turbulent mixing, but additionally, by selective mixing in combination with collision of the liquids, droplet formation within a liquid, and subsequent coalescing or segregation of the liquids. In part, the present invention makes use of the idea that evaporation of droplets can be initiated by reducing the surface tension which surrounds them and impedes their expansion. This surface tension is especially high in a dual fluid system such as a water droplet suspension in oil. The reduction in surface tension is obtained by allowing the individual liquid droplets to come together and coalesce. This reduces the superheating, i.e., temperature excess above saturation, required to produce boiling.

In further part, the present invention makes use of the difference in density between the two immiscible fluids used in the evaporative process. In the case of water and oil, the water is formed in streams which are sprayed onto an upper oil surface. Upon contact and collision with the oil, the water partially vaporizes. The remainder of the water, which cools as droplets, sinks down through the oil and receives heat from the oil. The droplets coalesce below the oil and form a thin water pool below the oil, thereby producing additional boiling as explained above. Special arrangements, to be described, may be provided to achieve this spraying, vaporization, colliding, first boiling, droplet formation, sinking and mixing for heat transfer, coalescing and further boiling, in repeated series of steps within a given stage of evaporation.

According to a still further aspect of the present invention, there are provided novel means for obtaining efficient packaging of evaporators utilizing a "lift" principle by which unevaporated liquids are raised in level from stage to stage by the difference in pressure between certain successive stages. These novel means, for example, permit a subsequent evaporator to be positioned at a lower level than a preceding evaporator, even though the preceding provides a positive lift. Arrangements such as this, which permit flexibility in elevational arrangements of evaporator stages, are achieved by providing descending outlet extensions from each preceding evaporator stage which produces a positive lift. These extensions are of relatively large cross section and they thereby enable boiling and evaporation to occur within them. In this manner, the extensions simulate a lower elevational level for the stage from which they depend and thus the lift produced by a preceding stage is made to start at a lower level than the bottom of the stage itself.

As illustratively embodied, the present invention also makes possible the maintenance of hydraulic sealing between stages. This is achieved in the present invention by separating, to a certain degree, the two liquids (e.g., oil and water) at the outlet of each stage and establishing separate hydraulic seals for these liquids. As a result of this, the tendency toward boiling in the hydraulic sealing means between the stages is reduced.

There has thus been outlined rather broadly the more important features of the invention in order that the detailed description thereof that follows may be better understood, and in order that the present contribution to the art may better appreciated. There are, of course, additional features of the invention that will be described hereinafter and which will form the subject of the claims appended hereto. Those skilled in the art will appreciate that the conception on which this disclosure is based may readily be utilized as the basis for the designing of other structures for carrying out the several purposes of the invention.

Specific embodiments of the invention have been chosen for purposes of illustration and description, and are shown in the accompanying drawings, forming a part of the specification, wherein:

FIG. 8 is an enlarged fragmentary elevation view, taken in section and illustrating an evaporator stage and an interstage connection for dual liquid evaporation according to the present invention;

Figure 1A:
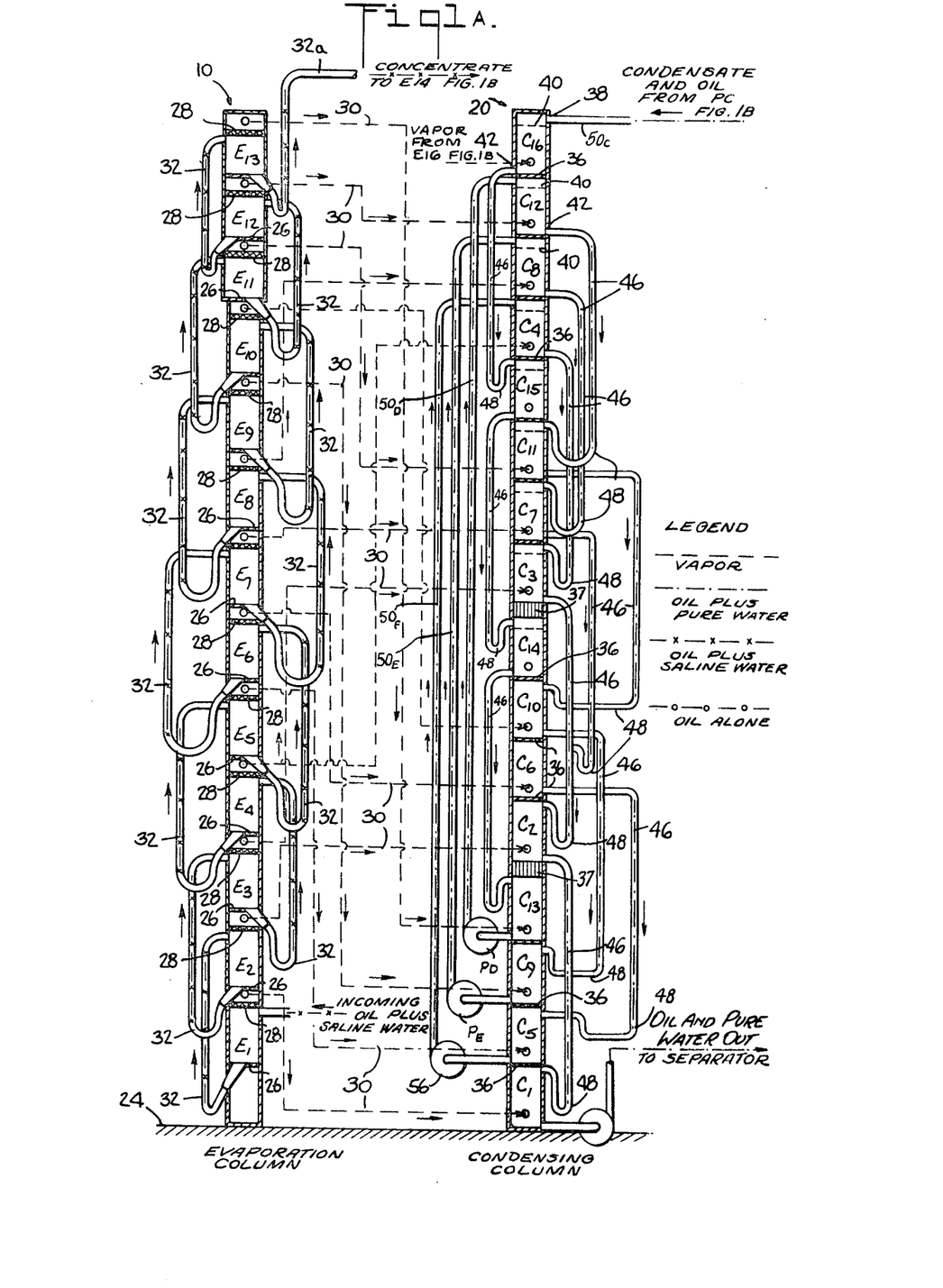
FIGS. 1A and 1B together constitute a partially diagrammatic representation of a desalination system in which the principles of the present invention are embodied.
Figure 1B:
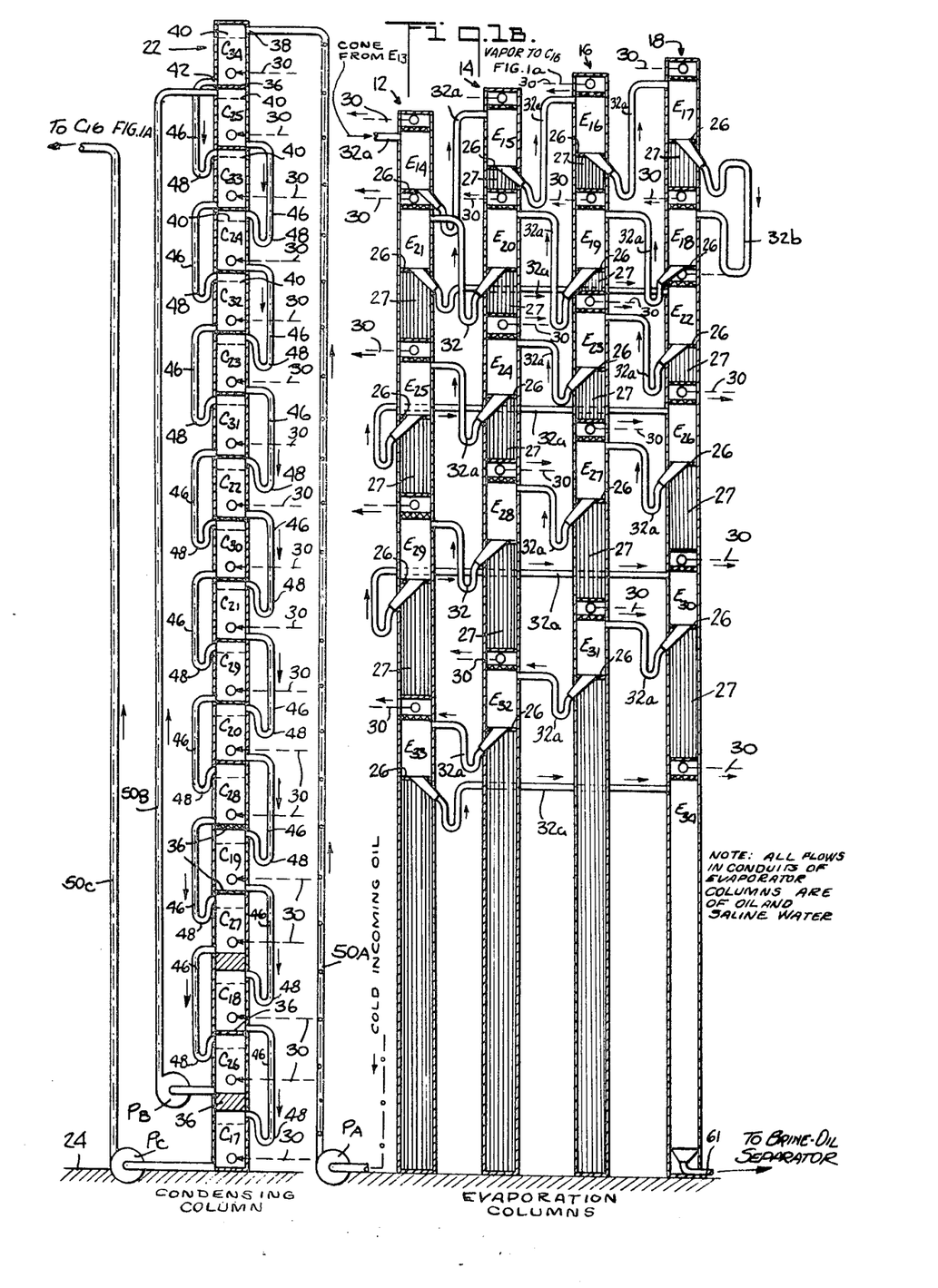
Figure 2:
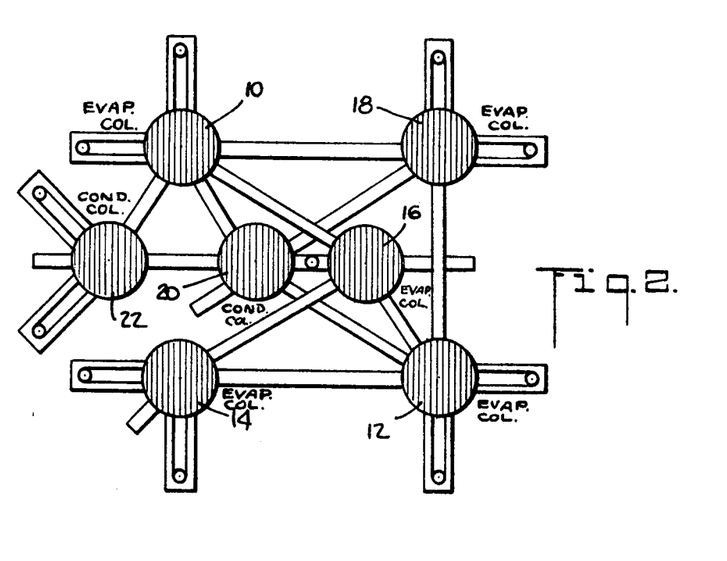
FIG. 2 is a top plan view showing the preferred lateral positioning of the major elements of the system of FIGS. 1A and 1B.

As shown in FIGS. 1A and 1B, a desalination system in which the present invention may be embodied is made up basically of a plurality of vertical pipes or columns including five evaporator columns 10, 12, 14, 16 and 18, and two condenser columns 20 and 22 are arranged in close proximity to one another. The columns each extend upwardly from the same datum or ground line 24 to about the same total height, although as will be appreciated from the description of operation, some of the columns may be higher than others.

The five evaporator columns 10, 12, 14, 16 and 18 are each divided by means of internal horizontal partitions 26 into a number of evaporator chambers $E_1$, $E_2$, ... $E_{34}$. In some cases, adjacent evaporator chambers in each column are vertically separated by voids or spaces 27. These occur as a result of the placement of the various evaporators at levels corresponding to the pressures at which they operate. Each evaporator chamber, in addition to the horizontal partitions 26, includes a demister element 28 near its upper end and extending across its interior. A vapor conduit 30 extends from each evaporator chamber E to a corresponding condenser chamber C. A U-tube interconnection 32 extends from the bottom of each evaporator chamber to the next evaporator chamber just below the demister element 28 of said next evaporator chamber. The various evaporator chambers E are thus connected in series by the U-tube interconnections 32; however, the series arrangement does not coincide fully with the evaporator arrangements along the various columns, except in the first column 10. In the first column 10, the first evaporator stages $E_1$, $E_2$, ... $E_{13}$ are arranged in ascending order up the column, and the U-tube interconnections 3 extend from each stage to the next higher stage in the column. The uppermost evaporator stage, $E_{13}$, of the first evaporator column 10 is connected by a crossover U-tube interconnection 32a to the uppermost evaporator stage $E_{14}$ of the second column 12; and evaporator stage $E_{14}$ in turn is interconnected via a crossover conduit 32a to the uppermost evaporator stage $E_{15}$ of the third evaporator column 14. Similar crossover U-tube interconnections 32a are made to the evaporator stages $E_{16}$ and $E_{17}$ at the upper ends of the fourth and fifth evaporator columns 16 and 18, respectively. The next evaporator stage $E_{18}$ is arranged in the fifth evaporator column 18 just below the stage $E_{17}$ and is connected to the stage $E_{17}$ by means of an extended U-tube interconnection 32b. The next subsequent evaporator stages $E_{19}$, $E_{20}$ and $E_{21}$ are arranged respectively under the stages $E_{16}$, $E_{15}$ and $E_{14}$ in the fourth, third and second evaporator columns 16, 14 and 12. These last-mentioned stages are interconnected by means of crossover U-tube interconnections 32a as previously described. The evaporator stages $E_{22}$... $E_{25}$ are located under the stages $E_{18}$ ... $E_{21}$ and are similarly interconnected. This arrangement is repeated for the stages $E_{26}$ ... $E_{29}$ and the stages $E_{30}$ ... $E_{34}$.

It will be noted that between the first evaporator stages there is provided a vertical displacement which corresponds to the height of the stages themselves, although the upper three stages $E_{11}$, $E_{12}$ and $E_{13}$ are shortened to reduce this vertical distance. To compensate volumetrically for the reduced height of these uppermost stages, they are provided with an enlarged diameter, although the remaining particulars of their structural makeup remains the same as in the other evaporator stages.

The vertically increased elevation of the adjacent evaporator stages 1 to 17 in the series corresponds to the "lift" due to the pressure difference between the adjacent stages in liquid head, less pressure losses. The "lift" as explained in the aforementioned Osdor applications which is achieved by the U-tube interconnections and by the energy of vaporization in addition to the pressure difference between adjacent stages, is substantially greater than the "lift" required by the arrangement of the present example. Also, the stages 18 to 34 are in decreasing elevation in this arrangement.

Figure 3:
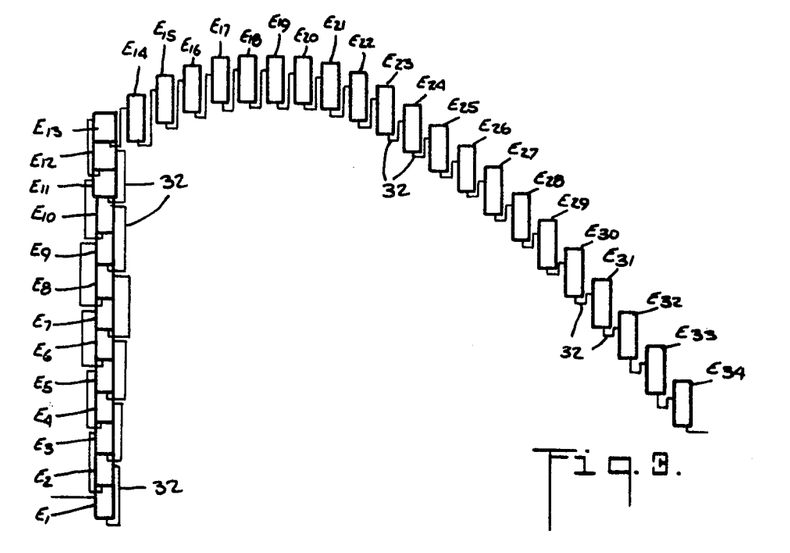
FIG. 3 is a diagrammatic view illustrating the elevational relationships of the several evaporation chambers forming one portion of the system of FIGS. 1A and 1B.

In general, at higher temperatures and pressures, the lift from stage to stage is greater than at lower pressures and temperatures. In order properly to match the obtainable lift to he characteristics of the fluids being employed, the evaporator stages are distributed among the various columns according to the previously described pattern. FIG. 3 shows this pattern laid out diagrammatically and indicates the relative vertical heights for a 34 stage evaporator system designed for operation between 180° C., and 45° C. It will be noted that the "lift" employed beyond the stage $E_{19}$ is actually a negative lift because the pressure difference between the adjacent low-temperature stages in liquid head is smaller than the height of the evaporator and the pressure losses due to the liquid flow through the U-tube.

The last evaporator stage $E_{34}$ is at a substantial height from the ground level of the first evaporator stage $E_1$. This height is chosen such that the pressure head of unevaporated blowdown liquid from the last evaporator stage $E_{34}$ to ground level will be sufficient to enable this liquid to be extracted from the last stage of the system, (which is below atmospheric pressure) without need for further pumping. The blowdown liquid, which in the present case constitutes a mixture of oil and unevaporated brine, is then passed to an oil-brine separator (not shown).

The two condenser columns 20 and 22 are divided internally by means of horizontal partitions 36 into several condenser stages $C_1$, $C_2$, ... $C_{34}$, of successively decreasing pressure. In some cases, voids or spaces 37 exist between adjacent stages. These result from the placement of the condensers at levels which, as will be explained, permit the utilization of gravity flow in the obtaining of a proper pressure head within the condenser. Each condenser stage includes a condensing liquid inlet 38 near the upper end, a liquid distribution element 40 just under the liquid inlet, and a condensing liquid and condensate outlet 42 near the lower end. The liquid distribution element 40 may comprise a multiple stream forming means such as a perforated plate or it may comprise a packing arrangement throughout the condenser region. Any system capable of providing large surface contact between the condensing liquid and vapors may be employed. The condensing liquid and condensate outlet 42 of each upper condenser stage in the columns 20 and 22 are connected via a downcomer 46 and a liquid trap 48 to the condensing liquid inlet 38 of a lower stage. As can be seen in FIGS. 1A and 1B, the various condenser stages C are not arranged in their respective columns in order of immediately decreasing pressure. Instead, the stages in column 20, i.e., stages from $C_1$ to $C_{16}$ are arranged in four interspersed groups while the stages in column 22, i.e., the stages from $C_{17}$ to $C_{34}$ are arranged in two interspersed groups. Thus, in column 22, the condenser stages from $C_{34}$ to $C_{26}$ are arranged in one group (group A) and are connected in series by their associated downcomers 46 and liquid traps 48 while the condenser stages from $C_{25}$ to $C_{17}$ are arranged in a second group (group B) and are also connected in series by associated downcomers 46 and liquid traps 48. In column 20, the condenser stages $C_{16}$, $C_{15}$, $C_{14}$, and $C_{13}$ are arranged in a third group (group C) stages $C_{12}$, $C_{11}$, $C_{10}$, and $C_9$ form a fourth group (group D) stages $C_8$, $C_7$, $C_6$, and $C_5$ form a fifth group (group E) and stages $C_4$, $C_3$, $C_2$, and $C_1$ form a sixth group (group F).

A condensing liquid pump $P_A$ is arranged to raise a cool direct contact liquid condensing medium, e.g., oil through a riser $50_A$ up to the top of group A. This liquid passes into the liquid inlet 38 of the condenser stage $C_{34}$. This liquid is formed into streams by the distribution element 40 and falls through the vapors flowing into the condenser stage from the corresponding evaporator stage, thereby to condense the vapors. The condensing medium and liquid condensate collected on the medium flow down together through the downcomer 46 and liquid trap 48 and into the next condenser stage $C_{33}$. The condensing process described above continues as the liquids flow serially through the firs condenser stages $C_{34}$ ... $C_{26}$ comprising (group A).

A further condensing liquid pump $P_B$ is arranged to raise the liquid from the lowermost condenser stage of group A, i.e., $C_{26}$, up through a riser $50_B$ to the top of condenser group B where it passes into the liquid inlet of the condenser stage $C_{25}$. Additional condensing liquid pumps $P_C$, $P_D$, $P_E$ and $P_F$ are arranged respectively at the outlets of the condenser stages $C_{17}$, $C_{13}$, $C_9$ and $C_5$ to pump the condensing liquids up through associated risers $50_C$, $50_D$, $50_E$ and $50_F$ to the uppermost condenser stages of these successive groups. While the pumps P produce substantial pressure increases, these are counteracted by the liquid pressure head in the risers 50 so that the pressure difference from stage to stage within each group continues from group to group.

It will be appreciated that the various pumps and condenser stage arrangements are such that the condensing liquids pass serially through each of the condenser stages in reverse order, i.e., from $C_{34}$ to $C_1$, while flowing downwardly by gravity through each of the six groups of condenser stages.

It will additionally be appreciated that the downcomers 46 extend substantial vertical distances between the adjacent condenser of each group and thereby provide the pressure head required for a continual flow of the condensing liquid from stage to stage against increasing pressure.

In operation of the above described system saline water mixed with hot oil passes through a system inlet conduit 60 and into the first or lowermost evaporator stage $E_1$. In this stage the hot oil and water are subjected to a first pressure reduction which causes a portion of the saline water to vaporize. The vapors thus formed pass through an associated vapor conduit 30 over to the highest pressure condenser $C_1$. Meanwhile the remaining unevaporated portion of the saline water and the accompanying oil are passed together through the U-tube interconnection 32 leading from the bottom of the evaporator stage $E_1$ and up to the second stage $E_2$. The oil and saline water at this point are slightly cooled, having given up some of their sensible heat to vaporize said portion of the brine in the first evaporator stage $E_1$. As a result, the vapor pressure of the liquid saline water is lowered. However, the second evaporator stage $E_2$ is maintained at a pressure slightly below this lower vapor pressure so that as the liquids enter the second stage further vaporization and associated temperature reduction take place. The vapors produced in this second evaporation stage are transferred via an associated connecting vapor conduit 30 over to the next lower pressure condenser stage $C_2$.

The arrangements of the evaporator stages and their associated U-tube interconnections produce a lifting action which drives the liquids, i.e., the oil and unevaporated saline water mixture, through the entire series of evaporator stages. Upon exiting from the last evaporator stage $E_{34}$, the oil-brine mixture is at a considerably lower pressure and temperature having given up its sensible heat to vaporize water in the various stages. The saline water is at increased salinity, having lost a large portion of its pure water content by vaporization. This oil and saline water can be reheated and passed through a similar series of evaporator stages forming a second cycle to produce additional vaporization. Actually, as taught in the aforementioned Osdor applications, a series of cycles may be provided to increase the salinity of the unevaporated saline water to a point where various salts will precipitate out. In this manner, the system may be employed not only as a fresh water recovery system but also as a salt recovery system.

The various condenser stages $C_1$, $C_2$ ... $C_{34}$ each receive vapors via the conduits 30 from the corresponding evaporation stages $E_1$, $E_2$ ... $E_{34}$ at the pressures and temperatures at which the vapors are produced. The vapors are condensed in these various condenser stages by subjecting them to direct contact with a condensing liquid. This liquid, which may be the cooled oil from the evaporator stages separated from the high-salinity liquid, passes first into the lowest pressure highest elevation condenser sage $C_{34}$ of the first group A. It flows down through this stage and condenses the vapors therein. During this condensing process, the oil absorbs the latent heat of vaporization of the vapors being condensed and in doing so it increases in temperature. The pure water liquid produced in the condenser stage passes with the oil down through the downcomer 46 to the next condenser stage $C_{33}$. This downward liquid movement is produced by gravity, and the pressure head provided by the difference in elevation between the successive stages $C_{34}$ and $C_{33}$ drives the oil and condensate into the second stage condenser $C_{33}$ where the vapor pressure is higher than within the preceding condenser $C_{34}$.

The oil and condensate produced thereby flow in this manner down through the group A condenser stages to the condenser stage $C_{26}$. At this point, the liquids are at their lowest elevation and are incapable of providing further pressure head for the subsequent condenser stages which receive vapors at still higher pressures.

Upon exiting from the condenser stage $C_{26}$, the liquids are pumped by the pump $P_B$ through the riser $50_B$ up into the next subsequent condenser stage $C_{25}$. Since the stage $C_{25}$ is immediately beneath the stage $C_34$ and at the highest elevation of the second group of stages, it is possible for the condensing liquid to flow downwardly by gravity through the condenser stages of group B to the condenser stage $C_{17}$. The condensing liquids are then pumped by the pump $P_C$ up to the condenser stage $C_{16}$ and the liquids pass down successively through the condenser stages of groups C, D, E and F in similar manner. Upon exiting from the highest pressure condenser stage $C_1$, the condensate, which is essentially pure water, may be separated from the condensing liquid or oil; and the oil after being additionally heated and mixed with hot saline water is recycled through the system.

The development of the condenser arrangements which permit the 34 stages to be integrated into two columns of minimal height can be seen in the operating condition relationships of table I below and in the diagram of FIG. 4. In table I:

T = temperature of the condensing liquid entering each stage in degrees centigrade (°C.);

P = pressure within each condenser stage in equivalent head of water, measured in meters (m.); and ΔP = pressure difference between adjacent condenser stages in equivalent head of water, measured in meters (m.)

ΔH = the vertical height required between adjacent condenser stages taking into consideration the pressure difference between stages (P), the use of oil as the condensing medium (specific gravity 0.8) and average pressure head losses from stage to stage (30 centimeters), indicated in meters (m.)

TABLE I

| CONDENSER GROUP A | | | | |
|---|---|---|---|---|
| Condenser | T | P | ΔP | ΔH |
|  | °C. | m. H$_2$O | m. H$_2$O | m. H$_2$O |
| 34 | 43.5 | 0.90 |  |  |
|  |  |  | 0.27 | 0.63 |
| 33 | 48.5 | 1.17 |  |  |
|  |  |  | 0.32 | 0.70 |
| 32 | 53.4 | 1.49 |  |  |
|  |  |  | 0.38 | 0.77 |
| 31 | 58.2 | 1.87 |  |  |
|  |  |  | 0.46 | 0.88 |
| 30 | 63.0 | 2.33 |  |  |
|  |  |  | 0.54 | 0.97 |
| 29 | 67.7 | 2.87 |  |  |
|  |  |  | 0.65 | 1.11 |
| 28 | 72.4 | 3.52 |  |  |
|  |  |  | 0.75 | 1.24 |
| 27 | 77.0 | 4.27 |  |  |
|  |  |  | 0.86 | 1.40 |
| 26 | 81.5 | 5.13 |  |  |
|  |  |  | 1.00 | 1.55 |

| CONDENSER GROUP B | | | | |
|---|---|---|---|---|
| Condenser | T | P | ΔP | ΔH |
| 25 | 86.0 | 6.13 |  |  |
|  |  |  | 1.13 | 1.70 |
| 24 | 90.4 | 7.26 |  |  |
|  |  |  | 1.29 | 1.91 |
| 23 | 94.8 | 8.55 |  |  |
|  |  |  | 1.46 | 2.11 |
| 22 | 99.1 | 10.01 |  |  |
|  |  |  | 1.60 | 2.30 |
| 21 | 103.3 | 11.61 |  |  |
|  |  |  | 1.81 | 2.56 |
| 20 | 107.5 | 13.42 |  |  |
|  |  |  | 2.04 | 2.85 |
| 19 | 111.7 | 15.46 |  |  |
|  |  |  | 2.23 | 3.09 |
| 18 | 115.8 | 17.69 |  |  |
|  |  |  | 2.43 | 3.32 |
| 17 | 119.8 | 20.12 |  |  |
|  |  |  | 2.62 | 3.58 |

| CONDENSER GROUP C | | | | |
|---|---|---|---|---|
| Condenser | T | P | ΔP | ΔH |
| 16 | 123.7 | 22.74 |  |  |
|  |  |  | 2.88 | 4.02 |
| 15 | 127.6 | 25.62 |  |  |
|  |  |  | 3.19 | 4.29 |
| 14 | 131.5 | 28.81 |  |  |
|  |  |  | 3.30 | 4.42 |
| 13 | 135.2 | 32.11 |  |  |
|  |  |  | 3.71 | 4.94 |

| CONDENSER GROUP D | | | | |
|---|---|---|---|---|
| Condenser | T | P | ΔP | ΔH |

| Condenser | T | P | ΔP | ΔH |
|---|---|---|---|---|
| 12 | 139.0 | 35.82 | | |
| | | | 3.83 | 5.09 |
| 11 | 142.6 | 39.65 | | |
| | | | 4.14 | 5.47 |
| 10 | 146.2 | 43.79 | | |
| | | | 4.49 | 5.91 |
| 9 | 149.8 | 48.28 | | |
| | | | 4.57 | 6.07 |

CONDENSER GROUP E

| Condenser | T | P | ΔP | ΔH |
|---|---|---|---|---|
| 8 | 153.2 | 52.85 | | |
| | | | 5.06 | 6.62 |
| 7 | 156.7 | 57.91 | | |
| | | | 5.01 | 6.56 |
| | 160.0 | 63.02 | | |
| | | | 5.65 | 7.36 |
| 5 | 163.4 | 68.67 | | |
| | | | 5.67 | 7.40 |

CONDENSER GROUP F

| Condenser | T | P | ΔP | ΔH |
|---|---|---|---|---|
| 4 | 166.6 | 74.34 | | |
| | | | 6.03 | 7.84 |
| 3 | 169.8 | 80.37 | | |
| | | | 6.22 | 8.07 |
| 2 | 172.9 | 86.59 | | |
| | | | 6.58 | 8.54 |
| 1 | 176 | 93.17 | | |

It can be seen from the foregoing table that the total pressure head between the first and the 34th condenser stages is 92.27 meters of water. Now, in most situations a condensing liquid lighter than water, e.g., oil having a specific gravity of 0.8, is employed in the system. Accordingly, this total pressure head amounts to 92.27/0.8, or about 115 meters. In addition, in order to overcome pressure head losses due to friction in the tubes and condensers an average of about 30 centimeters per stage or 10 meters total should be added to the system. Thus, the term ΔH in table I is calculated as follows:

$$H = P/0.8 + 0.30$$

In addition to the above, each condenser stage itself may be expected to occupy two meters of height so that the cumulative vertical displacement of the system without the height economization features of the present invention would be about 193 meters.

Figure 4:
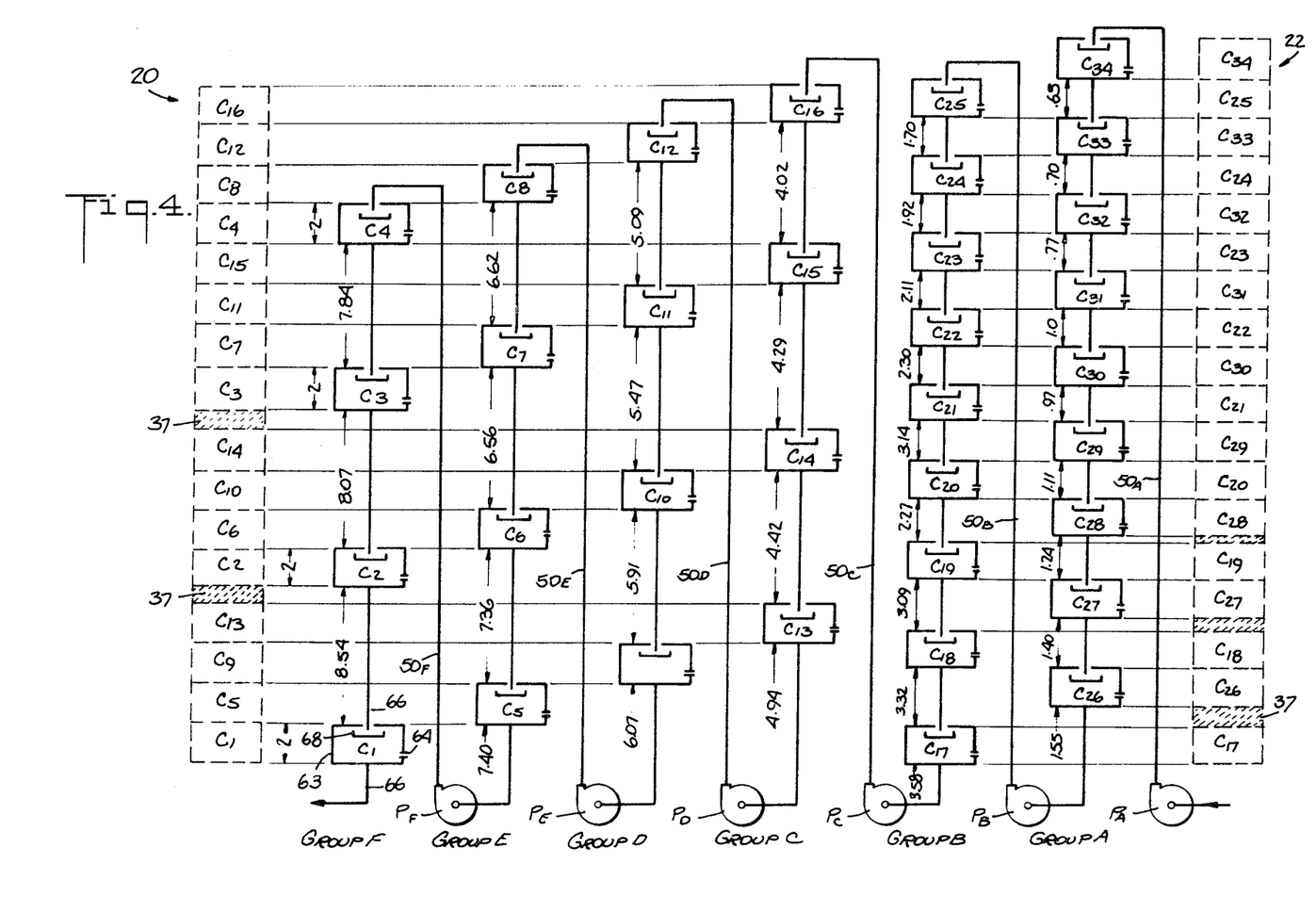
FIG. 4 is a diagrammatic representation of condenser arrangements illustrating the manner in which the present invention achieves savings in structural height through proper condenser interspersing.

FIG. 4 illustrates how a condenser system operating according to table I can be reduced in physical height to a practical level according to the present invention. In FIG. 4, the various condenser stages $C_1 ... C_{34}$, are shown diagrammatically to resemble the condensers used in the system of the aforementioned Osdor application Ser. No. 742,865. All the condenser stages are alike; and referring to the condenser stage $C_1$, it will be seen to include an outer chamber 60. A vapor inlet 64 is provided, this vapor inlet being connected to a corresponding evaporator stage (not shown). Condensing liquid enters via a downcomer 66 from the next higher stage $C_2$ and the condensing liquid and collected condensate exits from the bottom via a similar downcomer 66. A well-type trap 68 is provided at the condensing liquid entrance to each condenser stage; and this cooperates with the incoming downcomer 66 to achieve a hydraulic seal.

As can be seen clearly in FIG. 4, condensing liquid enters the system via the pump $P_A$ and is pumped up through the riser $50_A$ to the condenser stage $C_{34}$. It then passes down through the stages of group A and then is raised by the pump $P_B$ through the riser $50_B$ to the top of the group B condenser stages. The condensing liquid is pumped up and flows down by gravity successively through each of the groups A, B, C, D, E and F until it reaches the bottom of the condenser stage $C_1$. Thereafter, it passes along with all the condensate thus formed to a condensate-condensing liquid separation means (not shown).

Along the opposite sides of the groups of condenser stages in FIG. 4, are diagrammatic representations of the condenser columns 20 and 22. Now the physical distance required between adjacent condenser stages in order to maintain proper pressure in the stages, considering pressure losses (30 centimeters per stage) and the specific gravity of the condensing liquid (0.8) are given in the diagram. In addition, a vertical height of 2 meters is assigned to each condenser stage. While FIG. 4 is not to scale, it will be appreciated that for nearly all of the condenser stages of groups C, D, E and F, i.e., condenser stages $C_1 ... C_{16}$, the vertical distance required between adjacent condenser stages to achieve proper pressure, i.e., the oil pressure head displacement is greater than the physical displacement of three condenser stages, i.e., greater than 6 meters. Accordingly, by interspersing the four groups (C, D, E and F) of condenser stages, as is done in column 20, there results an available pressure head producing height of 6 meters between adjacent stages. In the case of the greater distance required between the condenser stages $C_1$, $C_2$ and $C_3$, the voids or spaces 37 may be provided. In those cases where the vertical displacement due to condenser height is greater than the required oil pressure head between consecutive stage, the liquid level in the downcomer 66 will automatically assume its required height.

A similar arrangement is seen for the groups A and B in column 22. For these condenser stages, however, the maximum pressure head difference is in most cases, less than the vertical displacement of one condenser stage, i.e., 2 meters. Accordingly, the two groups may be integrated in the column 22 with, of course, added voids or spaces 37 being provided where necessary, as for example, between the stages $C_{17}$, $C_{18}$ and $C_{19}$.

Figure 5:
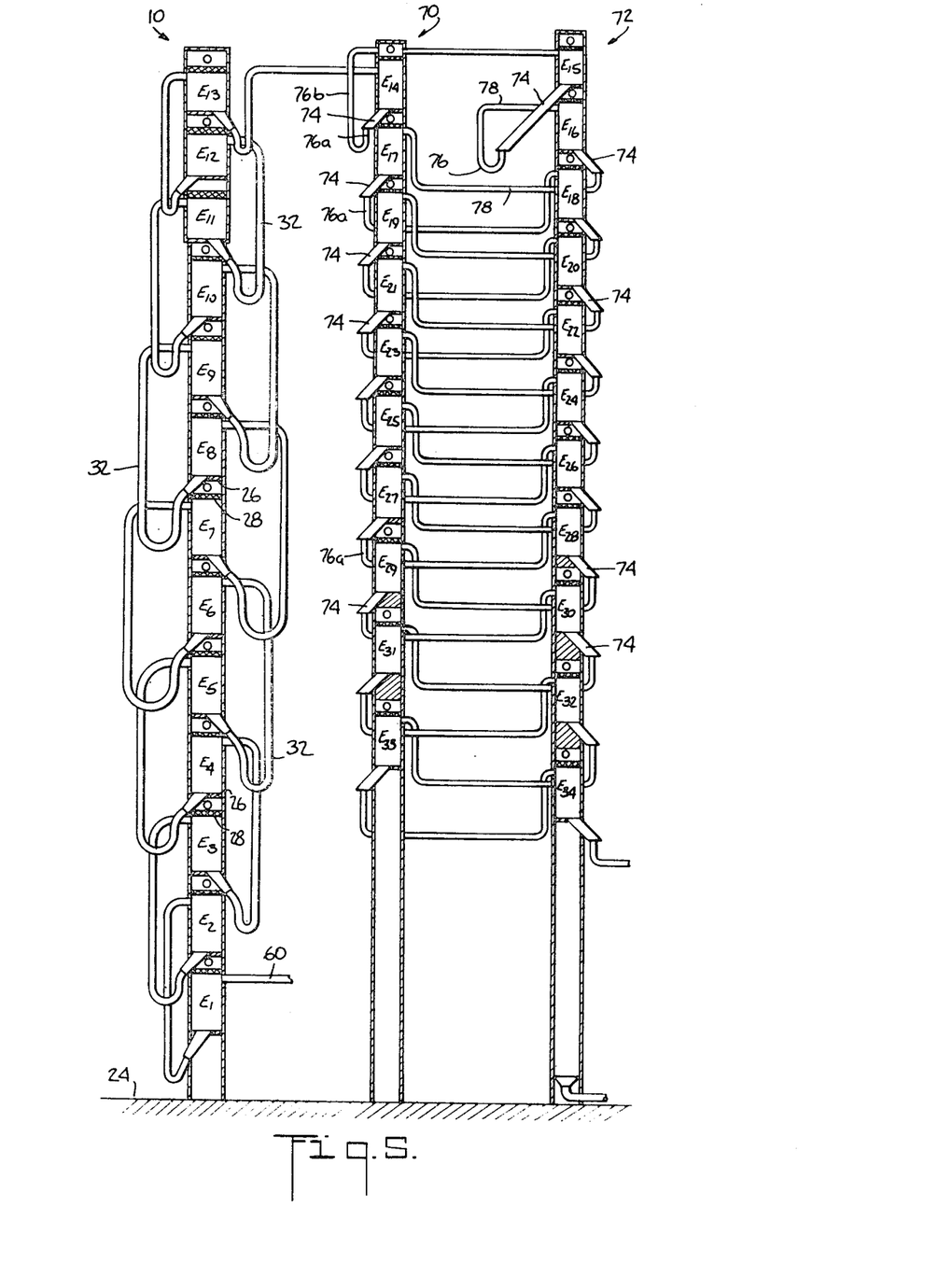
FIG. 5 is a diagrammatic representation of a modified evaporator arrangement according to the present invention
Figures 6, 7:
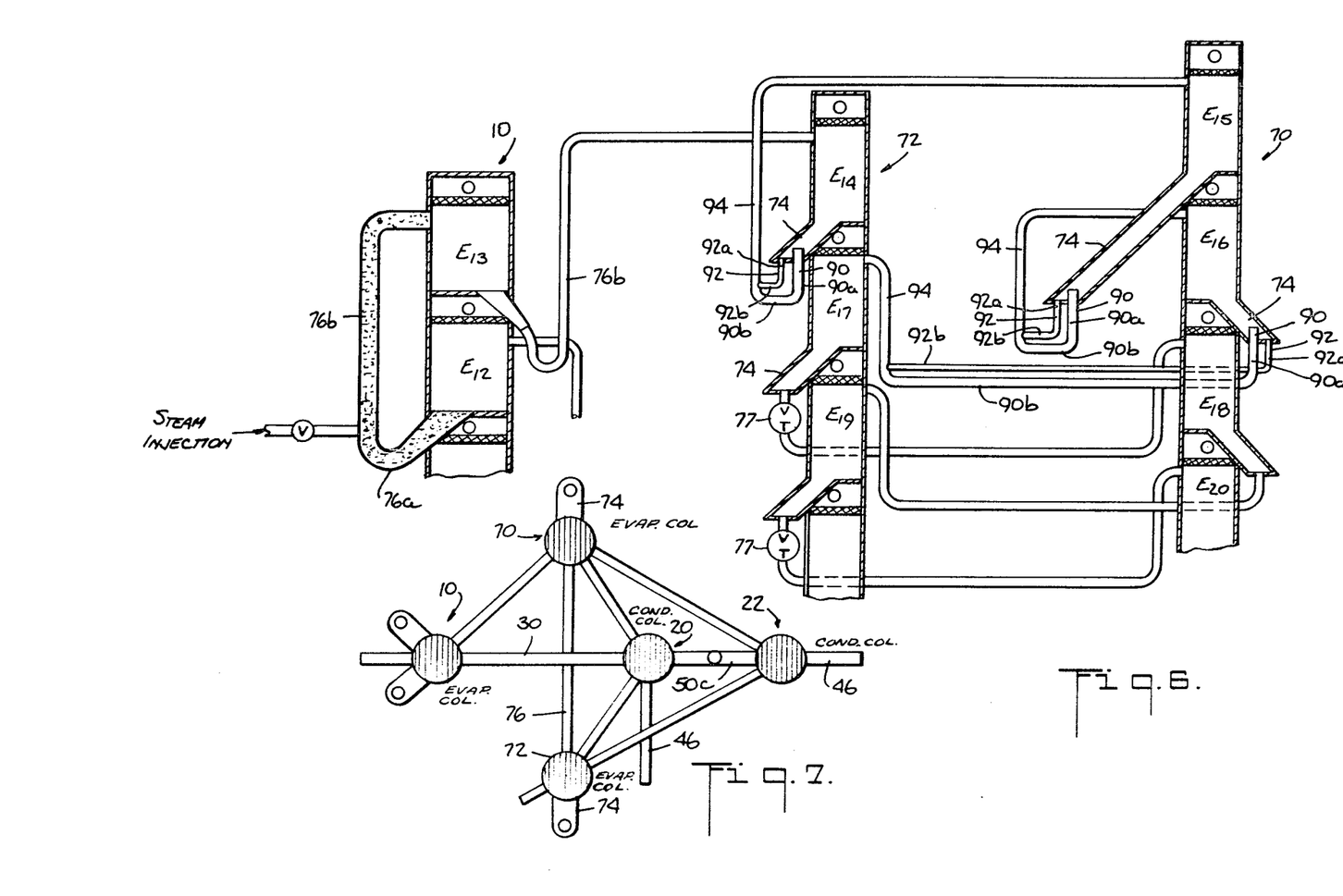
FIG. 6 is an enlarged fragmentary view of a portion of the evaporator arrangement of FIG. 5.
FIG. 7 is a top plan view similar to FIG. 2, but showing a system modified according to FIG. 5.
Figure 7:
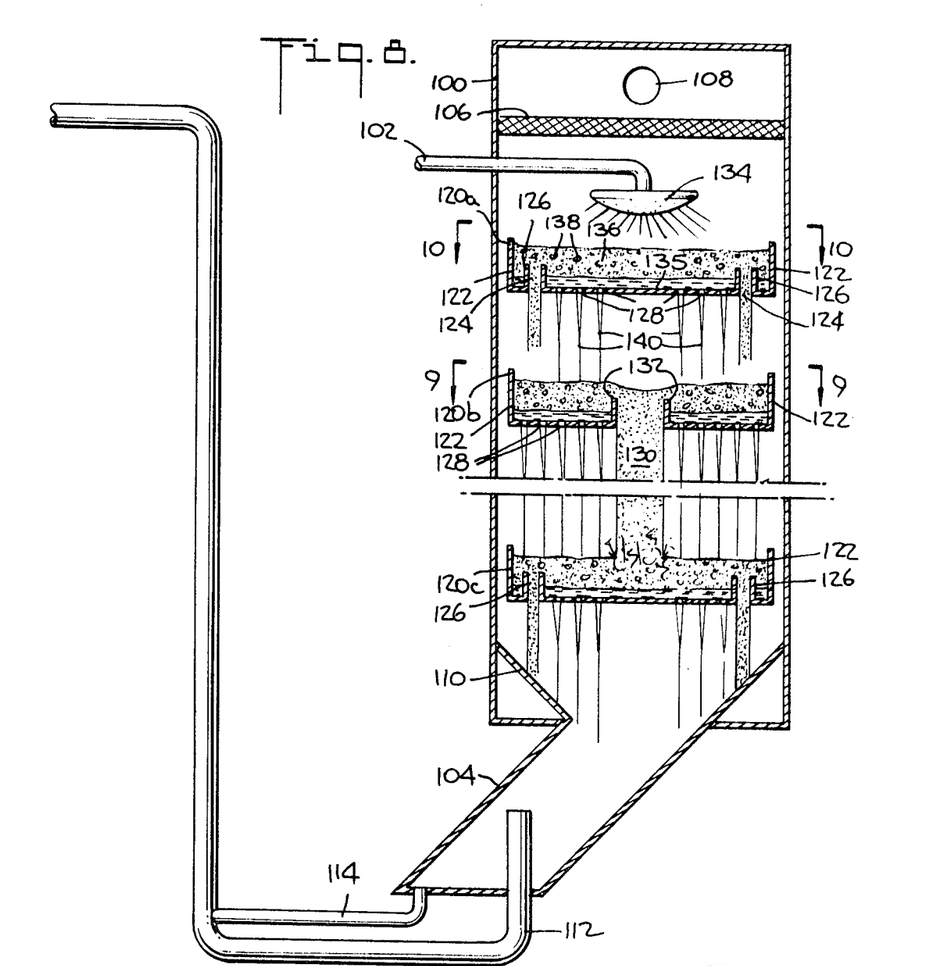

Turning now to FIGS. 5, 6 and 7, there is shown a modified evaporator arrangement which permits even further integration of evaporators wherein the number of evaporator columns can be reduced from five as shown in FIGS. 1A and 1B to three. Referring briefly to FIGS., it will be seen that in the columns 12, 14, 16 and 18, which contain the evaporator stages $E_{14} ... E_{34}$, a considerable amount of vertical height is lost to the voids or spaces 25. As pointed out previously, these spaces were required to maintain the evaporator stages at proper levels to provide the "lift" pattern shown in FIG. 3.

In the evaporator arrangement of FIG. 5 there are provided only two columns 70 and 72 for the evaporator stages $E_{14} ... E_{34}$. Column 10 for the first stages $E_1 ... E_{13}$ is the same as in the preceding embodiment.

In the arrangements of FIGS. 5–7, the internal construction of the individual evaporator stages may be the same as for the preceding embodiment. However, the evaporator stages are arranged somewhat differently in columns 70 and 72. As shown in FIG. 5, column 70 contains in ascending order of height, the following evaporator stages: $E_{33}$, $E_{31}$, $E_{29}$, $E_{27}$, $E_{25}$, $E_{23}$, $E_{21}$, $E_{19}$, $E_{18}$ and $E_{14}$. Column 72 contains in ascending order of height, the evaporator stages $E_{34}$, $E_{32}$, $E_{30}$, $E_{28}$, $E_{26}$, $E_{24}$, $E_{22}$, $E_{20}$, $E_{18}$, $E_{16}$ and $E_{15}$.

It will readily be seen that the actual physical elevational relationships of the various evaporator stages in the columns 70 and 72 does not correspond fully to the pattern shown in FIG. 3. For example, in FIG. 3, the evaporator stage $E_{16}$ is higher than the stage $E_{15}$, whereas in FIG. 5, $E_{15}$ is above $E_{16}$. In spite of this, it is possible according to the present invention to obtain the proper "lifts" between evaporator stages to simulate fully the lift pattern of FIG. 3.

This is achieved, as illustrated in FIG. 5, by providing a large diameter slanted extension 74 at the bottom of certain evaporator stages. These extensions effectively lower the bottom of the evaporator stage to a point where it is in a desired elevational relationship to the following stage.

At the bottom of each extension 74, there is provided a smaller diameter U-tube interconnection 76 including a downcoming leg 76a and an upcoming leg 76b to provide a controlled "lift" from the bottom of the extension up to level of the next successive evaporator stage. Crossover pipes 78 extend from the U-tube interconnections 76 to the inlet to the next successive evaporator stage.

It can be seen from FIG. 5 that with proper use of the U-tube a far greater utilization of the column 70 and 72 can be achieved than was possible in the arrangement of FIGS. 1A and 1B. Only a few relatively small voids or spaces 25 are needed between evaporator stages in the arrangement of FIG. 5.

FIG. 6 illustrates a "blowthrough" feature. This blowthrough arrangement operates to extend the boiling action in and through the U-tube interconnection 76 between a high-pressure evaporator stage (i.e., $E_{12}$) to a lower pressure evaporator stage $E_{13}$ so that it takes place along entire length of both the downcoming leg 76a and the upcoming leg 76b. In this way, the U-tube interconnection 76 accommodates a substantial portion of the total flashing from stage to stage. The beneficial effects of the blowthrough arrangement are obtained by the strong agitation of the fluids produced by the continuous boiling action. This agitation promotes heat transfer; and, also acts to reduce the superheating otherwise required for vaporization.

Figure 11:
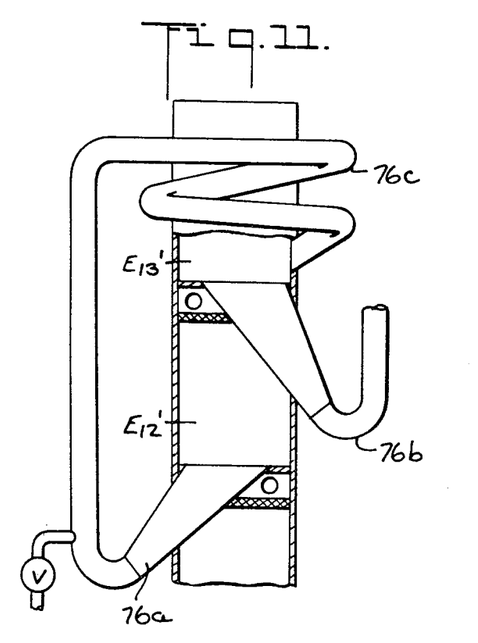
FIG. 11 is a partial view similar to FIG. 6 yet showing a further embodiment of the evaporator arrangement.
Figure 12:
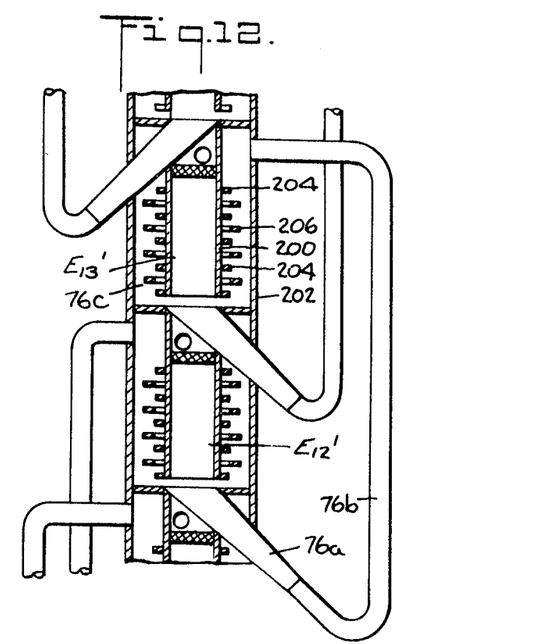
FIG. 12 is a partial view similar to FIG. 6 representing a further form of the invention.
Figure 14:
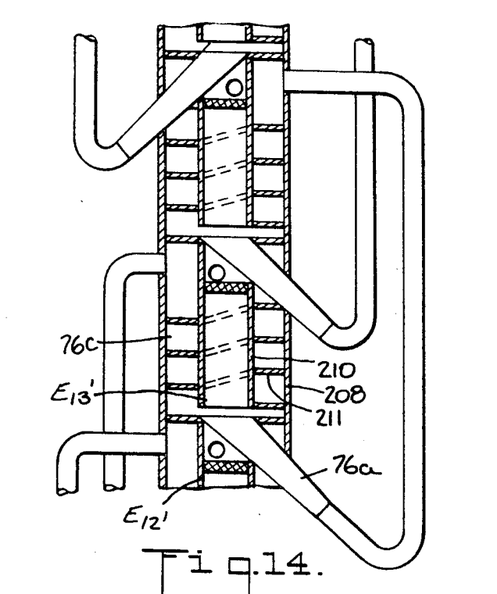
FIG. 14 is a partial view similar to FIG. 6 representing an additional form of the invention.

Further possible embodiments of a "blowthrough" or "-boilthrough" feature within a closed path may be seen in FIGS. 11, 12 and 14. Referring specifically to FIG. 11, there is shown two stages $E_{12}$, and $E_{13}$, of a plurality of stages of the liquid system. Generally, the stages are similar, i.e., with regard to their overall construction and the connecting conduit 76b leading to the next stage $E_{14}$, for example, to FIG. 6. However, the blowthrough tube connecting the stage $E_{12}$, to the stage $E_{13}$, is of increased length thereby to increase the flow path of the boiling mixture in the downward direction for at least the length of the stage to permit the bulk of evaporation of the flowing boiling liquid to occur within the tube length and closed flow path. The increased closed flow path obviates the necessity of the internal trays as shown in FIG. 8.

In FIG. 11, the U-tube interconnection between the higher pressure stage (i.e., $E_{12}'$) and the lower pressure stage $E_{13}'$ includes a downward portion 76a, an upward portion 76b and a further downward portion 76c providing for the extended length in the tube and closed flow path for the fluid. Any particular construction of extension may be employed which directs the boiling fluid generally downward from section 76b into the stage $E_{13}'$. One form may be a spiral construction as is shown in FIG. 11.

A further modification, again considering the stages $E_{12}'$ and $E_{13}'$ may be seen in FIG. 12. In this figure the downward closed spiral of FIG. 11 is eliminated and in its place there is provided a closed path including a plurality of baffles. The path is defined by an inner jacket 200 and the outer wall 202 of the various stages. The downward flow of the boiling mixture passes within this area and around the baffles. In this connection, there is provided a plurality of baffles 204 of, for example, annular configuration supported by the jacket 200. Interspersed between these baffles are baffles 206 which are also, as by a series of spokes (not shown), supported by the jacket. The baffles 206, however, provide a substantially annular opening adjacent the jacket whereas the baffles 204 cause the boiling mixture to flow over their peripheral region causing the mixture to follow a downward sinusoidal path. The baffles 206 may also be directly supported by the outer wall of the stages to provide the opening as previously described.

In FIG. 14, the spiral of FIG. 11 is located within a closed path defined by the outer wall 208 of the stage and the inner jacket 210. The spiral is formed by a sheet 211 forming bottom and top walls and serves the same purpose, as previously described.

Figure 13:
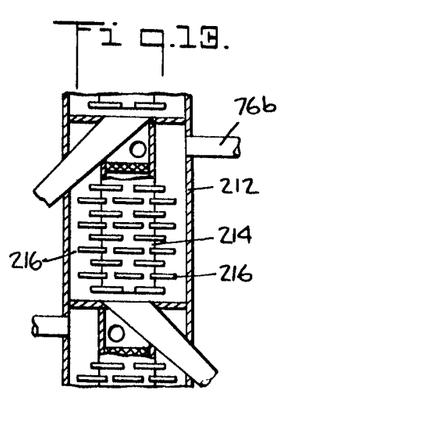
FIG. 13 is a partial view similar to FIG. 6 representing another form of the invention.

A further alternative is shown in FIG. 13. In this figure a closed path is similarly formed by the outer wall 212 of the stage and an inner jacket 214. In this form of the invention, however, the baffles of FIG. 12 have been replaced by a plurality of horizontal or slightly inclined and vertically staggered baffle segments 216 supported by the jacket. Whereas the figure shows the baffles to be supported on the outer wall surface of the jacket 214 they could similarly be supported on the inner wall surface of the jacket. In this connection the boiling mixture would be introduced within the jacket confines rather than between the jacket and the wall 212, with the vapor flowing upwardly between the jacket and the wall.

The increased flow path for the boiling liquid and vapor mixture allows for the utilization of stages having a small cross-sectional area in relation to the cross-sectional area of the stages of the FIG. 6 embodiment. In this connection with the bulk of evaporation taking place within the elongated path, little evaporation will take place within a stage, such as $E_{13}'$, so that the stages may function substantially solely as separators.

Each of FIGS. 11 through 14 could operate on the principal of total "blowthrough" or "boilthrough" with the entire closed path including both boiling liquid and vapor or on the principal of providing a U-tube and liquid seal with no boiling in the riser or boiling in the upper region of the riser and in the downward path, as seen in FIGS. 11-14.

Reference may be directed to FIGS. 5 and 6. In FIG. 5 and specifically with regard to certain of the low-temperature stages, for example, $E_{33}$ and $E_{34}$ wherein the difference in pressure between consecutive stages is small the tube connection is shown as including both a downward portion and an upward portion with an interconnecting portion. The connection between the stages $E_{19}$ and $E_{20}$ in FIG. 6 shows a similar conduit connection. Such orientation of the various portions of the conduit is to create a liquid seal between the stages. However, with the blowthrough arrangement wherein the liquid seal is not necessary the connection between the stages might be in a generally downward path.

The blowthrough arrangement is especially advantageous in a dual liquid system such as an oil-saline water mixture wherein special arrangements are otherwise necessary to obtain heat transfer and to overcome superheating. The liquid lift from stage to stage obtained with this arrangement is also greatly increased.

It is important in the blowthrough system to control the amount of vapor transfer from stage to stage. This can be done by controlling the lift required from stage to stage, and/or by throttling the boiling mixture flow in one of the legs of the U-tube interconnection 76, for example as shown at 77 in FIG. 6. It is presently considered preferable to control this throttling in a manner such that no more than about 10 percent of the vapors produced in one stage are carried over to the next stage.

While, as pointed out above, substantial advantages can be realized with a blowthrough arrangement, nevertheless, the accompanying transfer of vapors from stage to stage represents a heat loss. Now, these carried over vapors are eventually condensed after the last stage; they were initially produced in the first stage at high temperature and their heat was not recovered at the higher temperature levels. Their condensation at a substantially lower temperature therefore represents a heat loss.

The arrangement of FIG. 6 also includes novel interstage U-tube arrangements which serve to prevent blowthrough in a dual liquid system. These arrangements are shown between the evaporator stage $E_{14}$, $E_{15}$, $E_{16}$ and $E_{17}$. As shown, there are provided at the lower ends of the extensions 74 of the stages $E_{14}$, $E_{15}$ and $E_{16}$, a pair of tubular outlets 90 and 92. The first outlet 90 extends up into the extension 74 by some height. The other outlet 92 opens into the bottom of the extension 74. The two outlets 90 and 92 are each shaped in U-tube configuration, each having its own downcoming leg 90 and 92a respectively and its own crossover 90a leg and 92b respectively. The outlets 90 and 92 join, however, to form a common upcoming leg 94.

During operation of the system, a boiling water-oil mixture proceeds down the extension 74. As the mixture flows the heavier water tends to separate and flows down along the lower slanted side of the extension 74 to the bottom thereof. The water at the bottom of the extension flows out through the outlet 92 and down the downcoming leg 92a. Meanwhile, the oil which is lighter floats above the water and passes out of the extension 74 via the outlet tube 90 and down the downcoming leg 90a. It can be seen that the oil and water pass separately through the downcoming and crossover legs 90a and 90b and 92a and 92b of the outlet tubes 90 and 92. Boiling is substantially terminated in both tubes. In the oil outlet tube 90, there is practically no water to boil, an the oil thought hotter than the water is not at its own boiling temperature. In the water outlet tube 92, there is practically no oil present to supply heat to the water for boiling. There is thus established a liquid seal between consecutive stages. The two liquids are rejoined and mixed along the upcoming leg 94.

FIG. 7 illustrates in plan the arrangement of FIGS. 5 and 6 when used with column condenser in an evaporative recovery system. As can be seen, only five columns, i.e., the two condenser columns 20 and 22 and the three evaporator columns 20, 70 and 72 are needed for the system.

Figure 9:
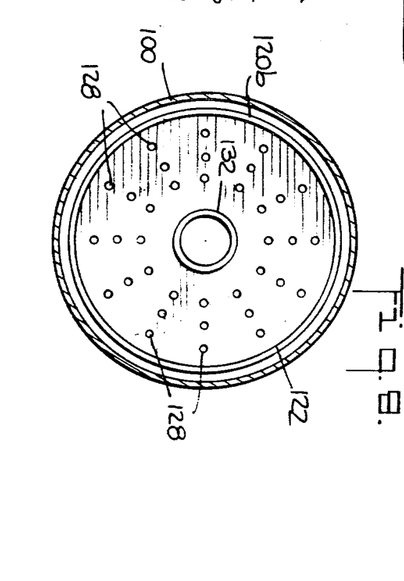
FIG. 9 is a section view taken along line 9—9 of FIG. 8.
Figure 10:
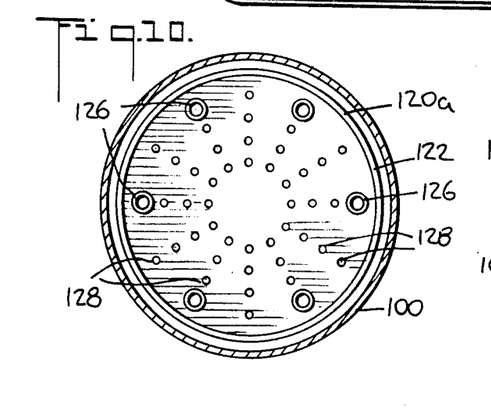
FIG. 10 is a further section view taken along line 10—10 of FIG. 8.

FIGS. 8-10 illustrate a novel arrangement for obtaining vaporization in a dual liquid system. As shown in FIG. 8 there is provided a chamber 100 having a oil-saline water mixture admission conduit 102 toward its upper end and an oil-saline water mixture outlet extension 104 at its lower end. A demister 106 extends across the interior of the chamber 100 above the admission conduit 102. A vapor outlet opening 108 is located above the demister 106.

The outlet extension 104, is of relatively large cross section and its upper end opens as a funnel 110 within the lower end of the chamber 100. The extension 104 is similar in construction to the extension 74 described in connection with the preceding embodiments. Outlet tubes 112 and 114 for separate saline water and oil transfer to the next subsequent stage are provided at the lower end of the extension 104 as previously described.

A plurality of trays 120a, 120b and 120c are arranged in stacked array within the chamber 100. As shown there are three such trays; however in a physical system many more may be employed. The uppermost tray 120a, as shown in FIGS. 8 and 10 is formed with a peripheral upstanding wall 122. A plurality of oil outlet openings 124 are distributed about the upper tray 120a near the wall 122. Smaller upstanding walls 126 surround each of the oil outlet openings 124. The remainder of the bottom surface of the upper tray 120a contains a number of small perforations 128 for the passage of water only in the form of streams. As will be explained the cross-sectional area of the perforations 128 is small to prevent oil from flowing through them and to maintain a finite head of water above them.

As shown in FIGS. 8 and 9, the second tray 120b is also formed with a peripheral upstanding wall 122. The tray 120b however, has a single centrally located oil outlet opening 130 which itself is surrounded by a smaller upstanding wall 132. The cross section of the opening 130 is about the same as the total cross section of the oil outlet openings 124 of the upper tray 120a. The remainder of the bottom of the second tray 120b contains a number of small perforations 128 similar to those of the upper tray 120a.

The lowermost tray 120c is similar in construction to the uppermost tray 120a; and any additional trays in the stacked array would be of alternate construction either as 120a or 120b, but different from the next preceding tray.

A liquid spray device 134 is connected to the admission conduit 102 and is mounted above the uppermost tray 120a.

In operation of the device of FIGS. 8-10, a mixture of hot oil and saline water enters the system via the admission conduit 102 and is sprayed through the spray device 134 onto the upper tray 120a.

The flow rate is regulated such that liquids accumulate in the tray. Because the liquids are immissible and because they are of different densities, the water will form a lower layer 136 lying on the perforated region of the tray 120a, below the upper edge of the walls 126. At the same time oil will form a floating layer 136 above the water layer 134. The oil layer however rises above the walls 126 surrounding the oil outlet openings 124 and therefore flows down through these openings to the next lower tray 120b. The outer wall 122 is sufficiently higher than the walls 126 to prevent oil overflow from the edge of the tray 120a.

It will be appreciated that with the above described flow regulation, there is created a free oil surface facing the spray device 134. Now as liquid continues to be sprayed out from the spray device 134, initially some vaporization occurs as the saline water in the spray experiences a pressure condition in the chamber 100 below its saturation pressure. The bulk of the saline water streams impinge upon or collide with the free surface of the hot oil within the upper tray 120a. The resulting water-oil collision provokes boiling and further vaporization. There is also produced a heat transfer from the oil surface to the impinging water which produces further boiling and vaporization The vaporization produced to this point results in a cooling of the still liquid portion of the saline water. This liquid portion then sinks through the hotter oil layer 136 in the form of small droplets 138 toward the water layer 135. As these droplets sink through the hotter oil they acquire heat from the oil; however because of their small size their surface tension prevents their boiling and as a result they become superheated. Upon reaching the water layer 135 the superheated droplets 138 coalesce and boil, thereby producing additional vapors.

The saline liquid forming the water layer 135 passes in the form of streams 140 through the perforations 128 in the plate 120a. These streams are directed upon an impinge against a free oil surface 136b in the second tray 120b. In the region of the second tray a vaporization, liquid impingement, boiling and vaporization, droplet formation and sinking with heat transfer, coalescence and further boiling takes place as described in connection with the upper tray 120a. The process continues in similar manner as the oil and saline water flow from tray to tray.

It will be noted that the oil openings 124 and 130 in the successive trays 120 are staggered so that there will be produced a continuous horizontal flow of oil along each tray, while a continuous downward movement of water in the form of streams and droplets is at the same time taking place. This exposes new oil surfaces to new water surfaces continually throughout the stage so as to produce maximum heat transfer between the two liquids.

The system of FIGS. 8-10 will operate in a similar manner for oil-water mixtures wherein the oil is heavier than the water. In such case the oil will sink as droplets to the bottom of each tray and pass in streams through the perforations 128 while the water will float on top and pass through the larger openings in the trays. The stream spray, impingement, heat transfer and vaporization described above however will take place in similar manner.

It will be understood that while the arrangement of FIG. 8 employs an interstage liquid seal system, the arrangement for improving dual liquid evaporation can also be used with a blowthrough interstage connection system.

The present invention, in addition to providing economy in total height of a gravity flow evaporation and condensation system, also provides a new concept of construction which permits a considerable reduction in fabrication costs. As can be seen in the drawings, both the evaporator and condenser stages may be built into elongated, substantially continuous pipelike columns. Openings may be provided for each stage along these columns for access to their interior along their length so that partitions separating the various stages can be inserted or replaced, as well as the other internal components of each stage. Simple door means may be provided to close these openings. All interconnecting piping may be supported alongside the columns for easy access and maintenance Thus it can be seen that with the present invention both the size and

What is claimed is:

1. A method for condensing vapors produced in a plurality of evaporator chambers at different pressures and temperatures, said method comprising the steps of flowing a coolant liquid downwardly through a first group of elevationally distributed condenser locations having free vertical spaces between and located to directly and sequentially contact vapors arriving from evaporator chambers of successively higher pressures while maintaining serial flow connecting columns of condensing liquid between adjacent ones of said group of locations, thereby to obtain successively increasing pressures at said locations and thereafter pumping the coolant liquid up from the lowermost of said locations to the uppermost of a further group of elevationally distributed condenser locations superposed with respect to those of the first group to directly and sequentially contact vapors from evaporator chambers of further successively still higher pressures, the vertical dimensions of the condenser locations in the further group being selected for interspersing between successive condenser locations in the first group so as to be wholly or partially accommodated in the free vertical spaces between the said successive condenser locations of said first group.

2. A method according to claim 1 wherein a plurality of said groups of locations are in vertical alignment.

3. A method according to claim 1 wherein said coolant liquid is pumped from the lowest location of each group to the highest location of each successive group thereby providing serial flow of coolant flow through all said locations.

4. A method according to claim 1 wherein the coolant liquid is oil.

5. A method according to claim 1 wherein the liquid condensate formed in the condensers flows along with the coolant liquid.

6. A method according to claim 1 wherein at least a portion of the coolant liquid is water.

7. Apparatus for condensing vapors at different pressures and temperatures, said apparatus comprising a plurality of superposed groups of condenser chambers, the chambers in each group being displaced elevationally from one another, the condenser chambers of individual groups being interspersed elevationally among the condenser chambers of other groups, each of said chambers including condensing liquid admission means leading into each chamber, condensing liquid distribution means within each chamber below the condensing liquid admission means, liquid outlet means leading out from the bottom of each chamber and means for receiving vapors into each chamber below its liquid distribution means, liquid conduit downcomer means interconnecting the liquid outlet means of each upper condenser with the liquid admission means of the next lower condenser of the same group and pumping means arranged to pump the condensing liquid from the liquid outlet means of the lowermost condenser in one group up to the liquid admission means of the uppermost condenser into the next group of higher pressure condensers, the vertical dimensions of the condenser chambers in the said groups being such as to permit interspersal therebetween of the successive individual condenser chambers in the remaining groups so as to be accommodated in the vertical distances between the said successive condenser locations.

8. Apparatus according to claim 7 wherein the downcomer means which extend between the condenser chambers in one group bypass the condenser chambers of other groups.

9. Apparatus according to claim 7 wherein said downcomer means are each provided with a liquid trap to ensure a hydraulic seal between adjacent condenser chambers.

10. Apparatus according to claim 7 wherein the condenser chambers of several groups are arranged in vertical alignment.

11. Apparatus according to claim 7 wherein the condenser chambers of several interspersed groups are formed in a vertically positioned cylinder divided by partitions to form the condensing chambers the cylinder being used as the main support for the condensing chambers.

12. In a multiple stage condenser system the combination of at least one vertically extending tubular column, plural partition means extending across the interior of said column and dividing same into a number of elevationally displaced condenser chambers, each chamber being formed with an upper condensing liquid admission opening, a lower condensing liquid outlet opening and a vapor admission opening therebetween, liquid distribution means arranged in each chamber, said condenser chambers being arranged in different groups with the vertically displaced condenser chambers of each group being interspersed elevationally among those which are similarly displaced in the other groups, the vertical dimensions of the vertically displaced condenser chambers in each group being such as to permit interspersal thereof between successive condenser chambers of the other groups and accommodation in the vertical distances between the said successive condenser locations, downcomer means interconnecting the condenser chambers of each group and extending between the liquid outlet opening of a higher condenser chamber and the condensing liquid admission opening of the next lower condenser chamber in the same group, and pumping means arranged to pump liquids from the condensing liquid outlet opening of the lowermost condenser chamber of one group up to the condensing liquid admission opening of the highest condenser chamber of the succeeding group.

13. In a multiple stage condenser system the combination of vertically extending tubular column means, a plurality of vertically spaced transverse partition means extending across the interior of said column means and dividing same into a number of elevationally displaced condenser chambers, each chamber being formed with an upper condensing liquid admission opening, a lower condensing liquid outlet opening and a vapor admission opening between the other two openings, downcomer means interconnecting the liquid admission and liquid outlet openings, each downcomer means bypassing at least one of said condenser chambers to extend from the lower condensing liquid outlet opening of a chamber above said one chamber to the upper condensing liquid admission opening of a chamber below said one chamber.

14. A multiple stage condenser system according to claim 17 wherein said column means comprises a plurality of columns and wherein each of said columns includes a plurality of groups of interspersed condenser chambers.

15. Apparatus for the evaporation separation of solvents and solutes from solution, said apparatus comprising a plurality of evaporation stages, means maintaining said stages at successively decreasing pressures and temperatures, liquid conduit means interconnecting said stages in series whereby a preheated liquid may flow through the stages and undergo successively decreasing pressures and temperatures to experience partial vaporization in each stage, a corresponding plurality of direct contact type condenser stages, vapor conduit means interconnecting each evaporation stage with a corresponding one of said condenser stages, said condenser stages being arranged in stacked relationship and interconnected by downcomers to permit a condensing liquid to flow down from stage to stage at successively increasing pressures, each downcomer bypassing at least one condenser stage to permit the obtaining of a condensing fluid pressure head between the stages connected by each downcomer, and pumping means arranged to pump the condensing liquid from the bottom of one group of downcomer interconnected condenser stages to the top of another group of stages bypassed by the downcomers of said one group.

16. A method f achieving evaporative separation of solvents and solutes from solution, said method comprising the steps of subjecting said solution to a series of pressure reductions to produce vapors of successively lower pressures and temperature, transferring the vapors thus produced to corresponding condenser stages arranged one above the other, causing a condensing liquid to flow downwardly and successively through different groups of interspersed condenser stages a number of times, and each time directing the flow of condensing liquid down through a different group of said condenser stages with downwardly increasing pressure while bypassing the condensing liquid around the condenser stages not in the group through which the fluid is passing in each downward flow and pumping the condensing liquid from the bottom of one group of condenser stages to the top of the next group of higher temperature and pressure.

17. A method for evaporating one of two mutually immiscible liquids as they move along together, said one liquid having a different vapor pressure and a different density than the other liquid, said method comprising the steps of maintaining a free surface on a body of the lower density liquid with a body of the higher density liquid directly therebelow and spraying hotter streams of the higher density liquid at said free surface to collide with it, transfer heat to and obtain vaporization of the liquid of higher vapor pressure, producing mixing of the two liquids by said spraying and collision, allowing the higher density liquid to sink through the lower density liquid to coalesce thereby reducing surface tension and superheat of said liquid of higher vapor pressure and obtaining further vaporization of the coalesced liquid of higher vapor pressure and spraying further streams of the higher density liquid onto a further free surface of said lower density liquid.

18. A method according to claim 17 wherein said lower density liquid is water and said higher density liquid is oil.

19. A method according to claim 17 wherein said higher density liquid is directed to fall down between vertically separated bodies of said lower density liquid in the form of sprays and to sink down through each body of said lower density liquid.

20. A method according to claim 17 wherein the higher density liquid is caused to move in a generally vertical direction as it is sprayed onto and sinks through the lower density liquid.

21. A method according to claim 20 wherein the lower density liquid is caused to move in horizontal directions while said higher density liquid is sprayed onto it and sinks through it.

22. In a multiple flash evaporation system the combination of a plurality of evaporation chambers, U-tube interconnection means arranged to transfer liquids from a higher pressure evaporator to the next lower pressure evaporator, said U-tube interconnection means comprising a large cross section inclined extension extending down from the bottom of the higher pressure evaporator, a pair of U-tubes extending down from said extension, one of said U-tubes having the downward leg extending from the bottom of said extension and the other having a downward leg extending up a finite distance into said extension clear of its upper opening, said U-tubes having upward legs which join together and extend to said next lower pressure evaporator.

23. In the multistage flash evaporation of liquids the steps of subjecting a heated liquid to a pressure lower than its saturation pressure in a first stage evaporation chamber to produce flash evaporation with consequent agitation and formation of a liquid and vapor mixture, passing the liquid and vapor mixture downwardly from the first stage evaporation chamber as a downwardly flowing mixture column and continuing the passage of the mixture upwardly as an upwardly flowing mixture column to a second stage evaporation chamber maintained at a pressure lower than the pressure in said first stage evaporation chamber, the continued presence of vapors in the mixture passing from said downwardly flowing mixture column to said upwardly flowing mixture column serving to promote agitation and heat transfer and thereby enhance vaporization in the upwardly flowing mixture column, and the degree of vapor transfer from stage to stage being less than about 10 percent of the vapors produced in the next preceding stage.

24. Multistage flash evaporation of liquid according to claim 23 wherein the degree of vapor transfer is less than about 10 percent of the vapors produced in the next preceding stage.

25. Multistage flash evaporation of liquid according to claim 23 wherein a substantial portion of the vaporization which takes place from the beginning of one stage to the beginning of the next stage occurs in said columns.

26. Multistage flash evaporation of liquid according to claim 23 wherein said upflowing column extends for a longer distance than said downflowing column to provide increased lift of the liquid flowing therethrough.

27. Multistage flash evaporation of liquid according to claim 23 further including the step of throttling the flow of liquid in one of said columns to control the degree of vapor transfer.

28. Apparatus for achieving flash evaporation of one of two liquids of higher and lower density, respectively, which flow along together, said apparatus comprising a chamber, means for directing the lower density liquid to flow as a body in horizontal directions through said chamber at different elevational levels, and means for spraying streams of the higher density liquid from level to level on the upper surface of the body of lower density liquid at each level and to sink down through the lower density liquid in the form of droplets, the means for directing the higher density liquid comprising a plurality of traylike elements superposed at different elevational levels within said chamber, said traylike elements having first, larger openings, staggered from tray to tray to permit transferral of the lower density liquid from element to element, said traylike elements further having spray orifices to permit the spraying down of said higher density liquid, said first larger openings being provided with upstanding walls surrounding them.

* * * * *